E. I. PEARSON.
SHORT CIRCUITING MEANS FOR ARMATURE WINDINGS.
APPLICATION FILED JAN. 19, 1921.
1,399,991.
Patented Dec. 13, 1921.
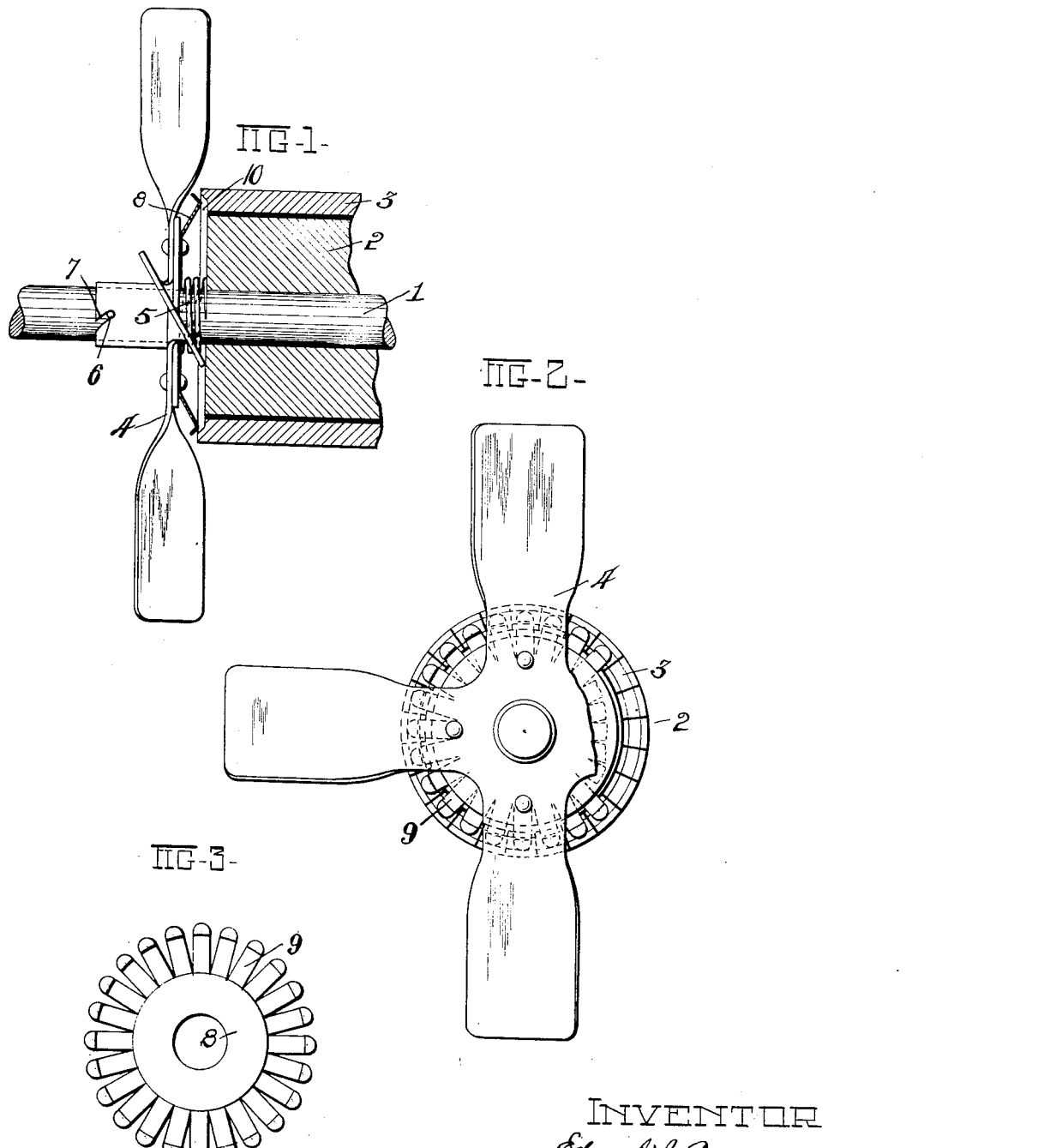
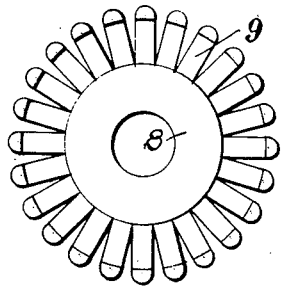
INVENTOR
Edward I. Pearson,
By Owen Owen & Crampton.
His attys.

UNITED STATES PATENT OFFICE.

EDWARD I. PEARSON, OF TOLEDO, OHIO.

SHORT-CIRCUITING MEANS FOR ARMATURE-WINDINGS.

1,399,991.  Specification of Letters Patent.  Patented Dec. 13, 1921.

Application filed January 19, 1921. Serial No. 438,333.

*To all whom it may concern:*

Be it known that I, EDWARD I. PEARSON, a citizen of the United States, and a resident of Toledo, in the county of Lucas and State of Ohio, have invented a certain new and useful Short-Circuiting Means for Armature-Windings; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to alternating current motors of the repulsion-induction type, wherein the motor is started on a commuted armature circuit and when up to a predetermined speed, the commuted winding is short-circuited and the motor then operated on the induction instead of on the repulsion principle.

The object of the invention is the provision in a motor of this class of simple and efficient means which is operated by fluid pressure, generated by a running of the motor, to automatically effect a short-circuiting of the commuted armature winding when the motor has attained a predetermined speed.

The invention is fully described in the following specification, and while, in its broader aspect, it is capable of embodiment in numerous forms, a preferred embodiment thereof is illustrated in the accompanying drawings, in which,—

Figure 1 is a side elevation of a device embodying the invention in operative relation to a motor commutator and with parts in section. Fig. 2 is a front end elevation thereof with parts broken away, and Fig. 3 is an inner view of the short-circuiting ring or member.

Referring to the drawings, 1 designates the armature shaft of the motor of the induction-repulsion type, and 2 the commutator mounted thereon and having the customary segments 3 insulated from each other and from the mounting, and, in the present instance, being disposed around the periphery of the commutator body or hub 2.

A fan 4 is mounted on the shaft 1 at the outer end of the commutator for limited movements longitudinally of the shaft and being normally held at the limit of its outward movement relative to the commutator by coiled compression spring 5 disposed around the shaft between the commutator and fan hub with its opposite ends-thrusts thereagainst. A pin 6 projects from the shaft into a slot 7 in the fan hub and coacts therewith to cause the fan to rotate with the shaft and at the same time permits a limited axial movement of the fan on the shaft. The blades of the fan are so disposed with respect to the direction of rotation thereof as to cause the fluid pressure, which is generated thereagainst by its rotation, to exert an inward movement thereon against the tension of the spring 5 so that when the generated fluid pressure on the fan has overcome the outward pressure of the spring 5 thereon, the fan will be caused to move inward toward the commutator.

A short-circuiting element 8 is carried by the fan hub for movements therewith, and is adapted to be moved into short-circuiting contact with the commutator segments 3 when the fan has moved inward a predetermined extent, thereby effecting a short-circuiting of the armature winding so that the motor will then run on the induction instead of on the repulsion principle. The short-circuiting element 8, in its present embodiment, comprises a collar or ring member of disk form, which may be stamped from sheet metal and has its outer edge portion split to form a plurality of circularly arranged fingers 9 that are bent laterally from the central portion of the disk to adapt them to have contact at their outer end portions with the commutator segments when moved for such purpose. The outer end portions of the fingers 9 are preferably bent back to adapt them to have flat contact with the outer inclined wall of a recess 10 formed in the commutator end. The short-circuiting disk is riveted or otherwise suitably secured to the fan hub.

It is evident that when the speed of the motor has been brought up to a point where the fluid pressure generated on the fan blades by the rotation thereof has become sufficient to overcome the outward pressure of the spring 5, the fan will be caused to move inward to place the short-circuiting element 8 in short-circuiting contact with the armature segments 3. An important feature of my invention consists in the fact that the movement of the fan toward the commutator compensates for any wear between the short-circuiting parts so that a perfect contact is insured at all times, and also that the pressure of the short-circuiting elements against the commutator segments increases with the speed of the motor. This action results in a continual automatic adjustable pressure of the short-circuiting element against the commutator bars when the element has been moved to short-circuiting position and the speed of the motor is maintained up to a predetermined standard. It is also evident that the fan 4 in addition to serving as a control means for the short-circuiting device also serves to create a current of air past the motor for cooling purposes.

I wish it understood that my invention is not limited to any specific construction, arrangement or form of the parts, as it is capable of embodiment in numerous forms, without departing from the spirit of the claims.

Having thus described my invention, what I claim as new and desire to secure by Letters Patent, is,—

1. In an electric motor, a commutator, and means operated by fluid pressure generated by a running of the motor to short-circuit the commutator segments when the motor has attained a predetermined speed.

2. In an electric motor, a commutator, an element adapted to have short-circuiting contact with the commutator segments, means normally maintaining the commutator segments and element out of contact, and means driven by the motor and pneumatically operated to cause relative short-circuiting movement between the commutator segments and said element when the motor has attained a predetermined speed.

3. In an electric motor, an armature winding having a plurality of contacts, an element normally out of, and movable into, short-circuiting engagement with the contacts, and means driven by the motor and pneumatically operated to move the element into short-circuiting engagement with the contacts when the motor has attained a predetermined speed.

4. In an electric motor, a commuator, an element normally out of, but movable into, short-circuiting contact with the commutator segments, and means driven by the motor and operable by fluid pressure generated by the rotation of the motor to move the element into short-circuiting position when the motor has attained a predetermined speed.

5. In an electric motor, a commutator, a fan driven by the motor and movable relative to the commutator, and a short-circuiting element carried by the fan, the fan being operable by fluid pressure thereon when running at a predetermined speed to move the element into short-circuiting contact with the commutator segment and maintain a continual pressure therebetween which increases with the speed of the motor.

6. In an electric motor, a commutator, a fan driven by the motor and movable axially of the commutator in one direction by fluid pressure thereon when rotating, means normally rotating the fan in predetermined relation to the commutator, and means operated by a fluid pressure actuated movement of the fan to short-circuit the commutator segment when the motor has attained a predetermined speed.

7. In an electric motor, an armature shaft, a commutator thereon, a fan mounted on the shaft for rotation therewith and for limited axial movements relative thereto at an end of the commutator, a spring normally maintaining the fan and commutator in predetermined spaced relation and a yielding contact element carried by the fan, the fan being operable by fluid pressure generated thereon by rotation thereof to move the element into short-circuiting contact with the contacting segment.

In testimony whereof, I have hereunto signed my name to this specification.

EDWARD I. PEARSON.